United States Patent
Guyon

(10) Patent No.: US 10,982,891 B2
(45) Date of Patent: Apr. 20, 2021

(54) METHOD FOR MANUFACTURING AN ICE PROJECTILE

(71) Applicant: COMMISSARIAT A L'ENERGIE ATOMIQUE ET AUX ENERGIES ALTERNATIVES, Paris (FR)

(72) Inventor: Frédérik Guyon, Leognan (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 91 days.

(21) Appl. No.: 16/321,245

(22) PCT Filed: Jun. 9, 2017

(86) PCT No.: PCT/FR2017/051471
§ 371 (c)(1),
(2) Date: Jan. 28, 2019

(87) PCT Pub. No.: WO2018/020089
PCT Pub. Date: Feb. 1, 2018

(65) Prior Publication Data
US 2019/0170419 A1 Jun. 6, 2019

(30) Foreign Application Priority Data
Jul. 29, 2016 (FR) ..................... 16/57408

(51) Int. Cl.
*F25C 1/00* (2006.01)
*B24C 1/00* (2006.01)
(Continued)

(52) U.S. Cl.
CPC ............... *F25C 1/00* (2013.01); *B24C 1/003* (2013.01); *F01D 21/045* (2013.01); *F02C 7/05* (2013.01); *F05D 2260/12* (2013.01)

(58) Field of Classification Search
CPC ... F25C 1/00; F25C 1/06; F28D 7/106; B24C 1/06; B24C 1/003
See application file for complete search history.

(56) References Cited

U.S. PATENT DOCUMENTS 3,696,636 A * 10/1972 Mille ................. F28D 7/024
62/399
5,319,946 A  6/1994 Manificat
(Continued)

FOREIGN PATENT DOCUMENTS

EP     2645021 A2    10/2013

OTHER PUBLICATIONS

English Machine Translation EP2645021 Abstract.
(Continued)

*Primary Examiner* — Elizabeth J Martin
(74) *Attorney, Agent, or Firm* — Cantor Colburn LLP

(57) ABSTRACT

The invention relates to a method for producing an ice projectile. The method comprises the steps of: —providing a quantity of water; providing a quantity of alcohol corresponding to at least 5 wt.-% of the quantity of water; mixing the quantity of water with the quantity of alcohol; transferring the mixture to means for cooling and solidifying the mixture to form a piece of ice; cooling the mixture in the cooling and solidifying means to a mixture-solidification temperature in order to produce at least one piece of ice; and launching the or each piece of ice at a target using launching means.

20 Claims, 2 Drawing Sheets

(51) Int. Cl.
*F01D 21/04* (2006.01)
*F02C 7/05* (2006.01)

(56) References Cited

U.S. PATENT DOCUMENTS

2006/0130886 A1* 6/2006 Tada ...................... B24C 1/003
                                                      134/198
2017/0122636 A1* 5/2017 Dolan ...................... F25C 1/06

OTHER PUBLICATIONS

International Search Report for Application No. PCT/FR2017/051471.
« ASTM F320: Standard Test Method for Hall Impact Resistance of Aerospace Transparent Enclosures.

* cited by examiner

METHOD FOR MANUFACTURING AN ICE PROJECTILE

CROSS REFERENCE TO RELATED APPLICATIONS

This application is a National Stage of PCT Application No. PCT/FR2017/051471 filed on Jun. 9, 2017, which claims priority to French Patent Application No. 16/57408 filed on Jul. 29, 2016, the contents each of which are incorporated herein by reference thereto.

TECHNICAL FIELD

The present invention concerns a method for manufacturing and using an ice projectile.

BACKGROUND

In the field of aeronautics, it is necessary to test the resistance of some structures to hailstones. This is for example the case of aircraft windscreens or jet engine blades.

Currently, there are four major methods used to make a projectile simulating a hailstone.

A first method allows making a hailstone close to what nature makes. According to this method, the projectile is made by successive solidifications of supercooled suspended water droplets. Another known method is the manufacture of a hailstone by continuous solidification of water vapor around a cold finger. These two methods allow obtaining mechanical properties close to those of the natural hailstone, but are very long and complex to implement.

Another method consists in placing water, where possible distilled or demineralized water, in a freezer type cooling enclosure. The mold in which the water is placed confers a first preform of the final shape, and a machining or a final polishing perfects the shape. This ice projectile, homogeneous in its composition, has significantly more degraded mechanical properties (worse mechanical strength) than those of the natural hailstone.

Finally, it is known to add a cotton ball, or more generally fibers, to water, where possible distilled or demineralized. This method is the subject of a standard «ASTM F320: Standard Test Method for Hail Impact Resistance of Aerospace Transparent Enclosures». As for the aforementioned ice projectile made of only water, the whole is placed in a cooling enclosure and the shape is given by the mold, then a mechanical or manual finish is carried out. This ice projectile, heterogeneous in its composition, has significantly better mechanical properties (better mechanical strength) than those of the natural hailstone.

The drawback of the first two techniques is the complexity and the very long duration of manufacture of the ice projectile. The drawback of the third technique is the use of a projectile which is less resistant than the natural hailstone, and therefore the making of a less destructive test than with a real hailstone and consequently, the underestimate of the impact of a real hailstone. Conversely, the drawback of the fourth one is to lead to a test which overestimates the impact of a real hailstone. In addition, this fourth technique, by the heterogeneous nature of the projectile, can induce a considerable dispersion between two tests for small-sized projectiles. Generally, in order to supervise the actual effects of hail, the third and fourth techniques are used together, which amounts to doubling the number of tests.

BRIEF SUMMARY

Consequently, the object of the present invention is to provide a manufacturing and use method which allows quick and easy manufacture of ice projectiles having mechanical characteristics similar to the mechanical characteristics of natural hailstones.

DETAILED DESCRIPTION

Figure 1:
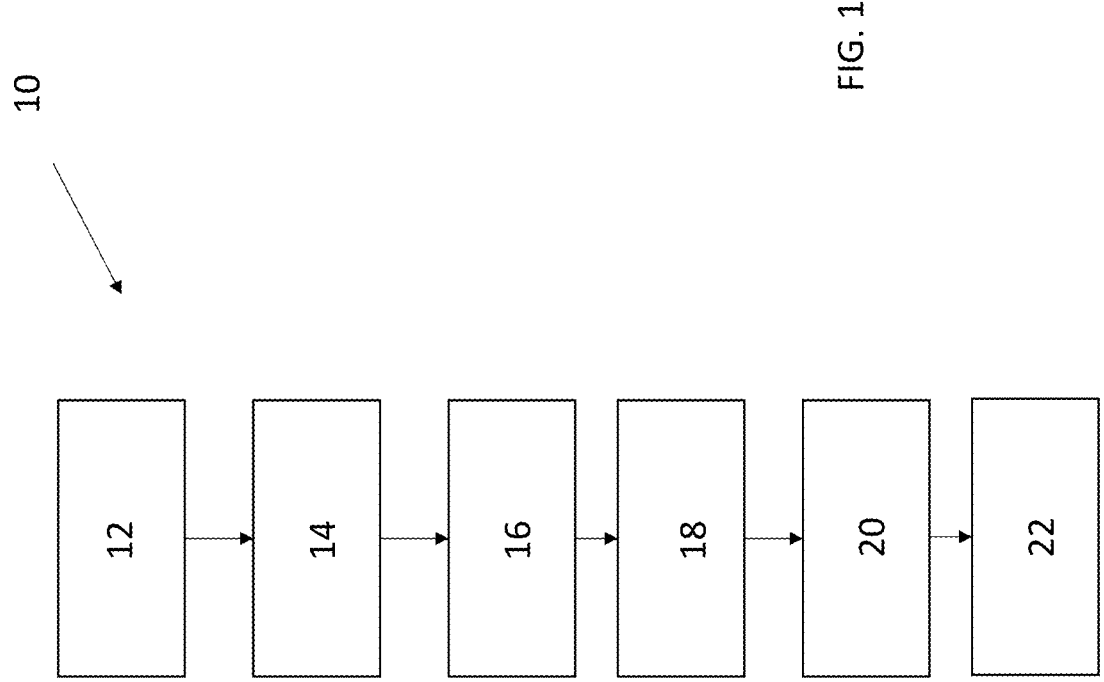
FIG. 1 illustrates a method for manufacturing and using an ice projectile.

Referring now to FIG. 1 and according to a general definition, the invention concerns a method 10 for manufacturing and using an ice projectile. The method comprises the steps of:

providing an amount of water 12;
providing an amount of alcohol 14 corresponding to at least 5 weight % of the amount of water;
mixing the amount of water and the amount of alcohol 16;
transferring the mixture to means for cooling and solidifying the mixture into a block of ice 18;
cooling the mixture 20 in the means for cooling and solidifying the mixture into a block of ice, down to a solidification temperature of the mixture, in order to obtain at least one block of ice,
projecting 22 the, or each, block of ice on a target, by projection means.

The mixture of water and alcohol allows slowing down the solidification process during cooling. Thus, before being completely solidified, the liquid mixture passes through an aqueous phase in which crystals mainly constituted by water are surrounded by a liquid solution mainly constituted alcohol. This aqueous phase, before the total solidification, enables a relaxation of the internal stresses induced by the crystallization of the water and its volumetric expansion. The liquid solution that surrounds the crystals acts as a lubricant.

In addition, the mixture of water and alcohol allows precisely controlling the final dimensions of the block of ice: the thermal expansion taking place in the aqueous phase, it is homogeneously distributed in all directions of the block of ice, unlike a pure water block of ice which is locally deformed and frozen at slightly different moments from one point to another of the block of ice.

The method according to the invention allows quick and simple manufacture of ice projectiles by using a mixture of water and alcohol.

In addition, the mixture of water and alcohol allows manufacturing ice projectiles having mechanical characteristics similar to the mechanical characteristics of natural hailstones.

Furthermore, the method according to the invention allows manufacturing ice projectiles composed of volatile elements which leave no solid residue after the projection and drying thereof, unlike the projectiles that contain a solid fiber core.

According to a particular arrangement, the solidification temperature of the mixture is substantially equal to 200K.

The step of cooling the mixture in the means for cooling and solidifying the mixture into a block of ice, down to a solidification temperature of the mixture, in order to obtain at least one block of ice, has a transition temperature range in which the mixture has an aqueous phase composed of solid crystals mainly composed of water, the solid crystals being surrounded by a liquid solution mainly composed of alcohol.

According to a particular arrangement, the transition temperature range may be comprised between 270K and 230K.

According to a particular arrangement, the step of cooling the mixture in the means for cooling and solidifying the mixture into a block of ice, down to a solidification temperature of the mixture, in order to obtain at least one block of ice may be performed at a rate higher than or equal to 0.5K per second.

Thus, the method according to the invention allows quickly producing an ice projectile from liquid solutions.

According to another particular arrangement, the step of cooling the mixture in the means for cooling and solidifying the mixture into a block of ice, down to a solidification temperature of the mixture, in order to obtain at least one block of ice may be performed at a rate lower than or equal to 0.5K per second.

According to the same arrangement, the step of cooling the mixture in the means for cooling and solidifying the mixture into a block of ice, down to a solidification temperature of the mixture, in order to obtain at least one block of ice is performed by stirring the mixture to maintain the homogeneity thereof.

The step of projecting the, or each, block of ice is carried out at a temperature comprised between 60K and 250K.

The temperature of the ice projectile during the projection thereof allows optimizing the mechanical properties to simulate as accurately as possible a hailstone.

Figure 2:
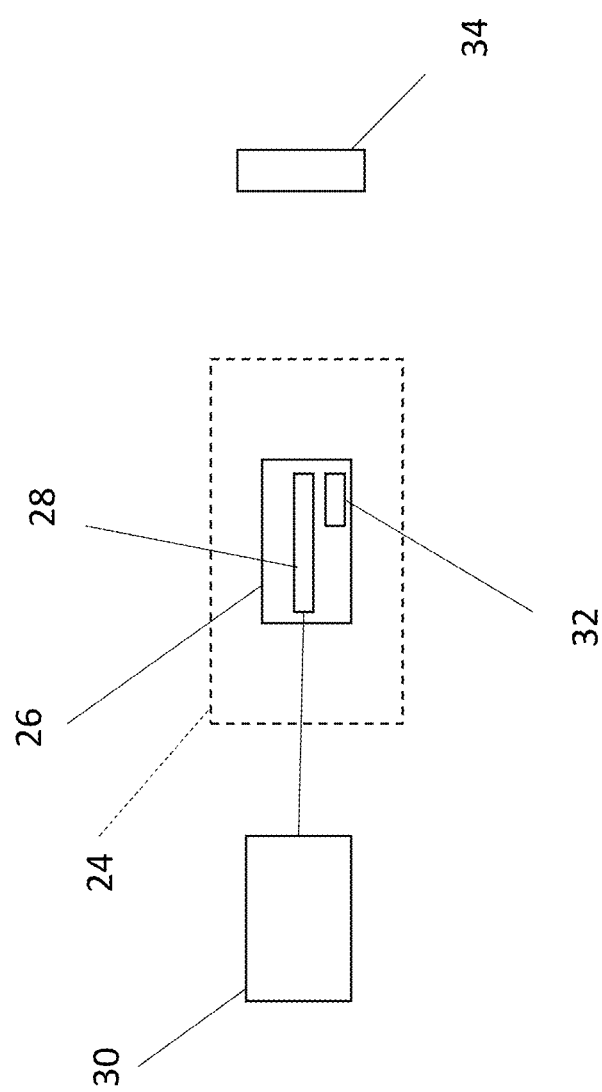
FIG. 2 illustrates schematically the means for shaping at least one block of ice according to a method of the present disclosure.

Referring now to at least FIG. 2, a cooling and solidifying means 24 is illustrated schematically, the cooling and solidifying means may comprise at least one mold 26 (illustrated schematically) for shaping at least one block of ice.

The cooling and solidifying means can comprise at least one tube 28 (illustrated schematically) allowing cooling and shaping at least one block of ice.

The at least one tube 28 may be connected to projection means 30 (illustrated schematically) allowing projecting the, or each, block of ice positioned in the corresponding tube towards a target 34.

Thus, the ice projectile can be solidified and projected by the same device.

The cooling and solidifying means may comprise at least one cryostat 32 (illustrated schematically).

The alcohol may belong to the group comprising ethanol, methanol, butanol and propanol.

The amount of alcohol is provided by an alcoholic solution having a purity higher than or equal to 90%.

The water is provided by an aqueous solution taken from distilled water and demineralized water.

The invention claimed is:

1. A method for manufacturing and using an ice projectile wherein it comprises the steps of:
    providing an amount of water;
    providing an amount of alcohol corresponding to at least 5 weight % of the amount of water;
    mixing the amount of water and the amount of alcohol to provide a mixture of water and alcohol;
    transferring the mixture to means for cooling and solidifying the mixture into a block of ice;
    cooling the mixture in the means for cooling and solidifying the mixture into a block of ice, down to a solidification temperature of the mixture, in order to obtain the block of ice; and
    projecting the block of ice onto a target.

2. The method according to claim 1, wherein the step of cooling the mixture in the means for cooling and solidifying the mixture into a block of ice, down to the solidification temperature of the mixture, in order to obtain the block of ice, has a transition temperature range in which the mixture has an aqueous phase composed of solid crystals mainly composed of water, the solid crystals being surrounded by a liquid solution mainly composed of alcohol.

3. The method according to claim 2, wherein the step of cooling the mixture in the means for cooling and solidifying the mixture into a block of ice, down to the solidification temperature of the mixture, in order to obtain the block of ice is performed at a rate higher than or equal to 0.5 K per second.

4. The method according to claim 2, wherein the step of cooling the mixture in the means for cooling and solidifying the mixture into a block of ice, down to the solidification temperature of the mixture, in order to obtain the block of ice is performed at a rate lower than or equal to 0.5 K per second.

5. The method according to claim 4, wherein the step of cooling the mixture in the means for cooling and solidifying the mixture into a block of ice, down to the solidification temperature of the mixture, in order to obtain the block of ice is performed by stirring the mixture to maintain the homogeneity thereof.

6. The method according to claim 2, wherein the step of projecting the block of ice is carried out at a temperature comprised between 60K and 250K.

7. The method according to claim 2, wherein the cooling and solidifying means comprise at least one mold for shaping the block of ice.

8. The method according to claim 1, wherein the step of cooling the mixture in the means for cooling and solidifying the mixture into a block of ice, down to the solidification temperature of the mixture, in order to obtain the block of ice is performed at a rate higher than or equal to 0.5 K per second.

9. The method according to claim 8, wherein the cooling and solidifying means comprise at least one mold for shaping the block of ice.

10. The method according to claim 1, wherein the step of cooling the mixture in the means for cooling and solidifying the mixture into a block of ice, down to the solidification temperature of the mixture, in order to obtain the block of ice is performed at a rate lower than or equal to 0.5 K per second.

11. The method according to claim 10, wherein the step of cooling the mixture in the means for cooling and solidifying the mixture into a block of ice, down to the solidification temperature of the mixture, in order to obtain the block of ice is performed by stirring the mixture to maintain the homogeneity thereof.

12. The method according to claim 1, wherein the step of projecting the block of ice is carried out at a temperature comprised between 60K and 250K.

13. The method according to claim 1, wherein the cooling and solidifying means comprise at least one mold for shaping the block of ice.

14. The method according to claim 1, wherein the cooling and solidifying means comprise at least one tube for cooling and shaping the block of ice.

15. The method according to claim 14, wherein the at least one tube allows for projecting of the block of ice positioned in the at least one tube.

16. The method according to claim 1, wherein the cooling and solidifying means comprise at least one cryostat.

17. The method according to claim 1, wherein the alcohol belongs to the group comprising ethanol, methanol, butanol and propanol.

18. The method according to claim 1, wherein the amount of alcohol is provided by an alcoholic solution having a purity higher than or equal to 90%.

19. The method according to claim 1, wherein the water is provided by an aqueous solution taken from distilled water and demineralized water.

20. The method according to claim 1, wherein the block of ice is projected from the means for cooling and solidifying the mixture into a block of ice.

* * * * *